US011038710B2

(12) United States Patent
Chamarajnager et al.

(10) Patent No.: US 11,038,710 B2
(45) Date of Patent: *Jun. 15, 2021

(54) CONTROLLING PROXY DEVICES THROUGH A MANAGED GATEWAY

(71) Applicant: VMware, Inc., Palo Alto, CA (US)

(72) Inventors: Ravishankar Chamarajnager, Atlanta, GA (US); Michael Robert Jones, Hudson, OH (US); Paul Alexander Cowan, Humble, TX (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,515

(22) Filed: Jun. 5, 2019

(65) Prior Publication Data
US 2019/0288869 A1    Sep. 19, 2019

Related U.S. Application Data

(63) Continuation of application No. 15/463,103, filed on Mar. 20, 2017, now Pat. No. 10,333,733.

(51) Int. Cl.
*H04L 12/28* (2006.01)
*H04L 29/08* (2006.01)
*H04L 12/24* (2006.01)

(52) U.S. Cl.
CPC ........ *H04L 12/2832* (2013.01); *H04L 41/046* (2013.01); *H04L 67/12* (2013.01); *H04L 67/125* (2013.01); *H04L 67/34* (2013.01)

(58) Field of Classification Search
CPC ............. H04L 12/2807; H04L 12/2816; H04L 12/2832; H04L 41/08; H04L 41/046;
(Continued)

(56) References Cited

U.S. PATENT DOCUMENTS 9,350,615 B2 *  5/2016  Lee ..................... H04L 41/046
2004/0267918 A1 * 12/2004  Guarraci ............. G06F 11/2294
                                                              709/223
(Continued)

OTHER PUBLICATIONS

Skaalsveen, Anders. Development of smart devices in Node. JS. An exploratory approach. MS thesis. 2015. (Year: 2015).*

(Continued)

*Primary Examiner* — John A Follansbee
*Assistant Examiner* — James N Fiorillo
(74) *Attorney, Agent, or Firm* — Clayton, McKay & Bailey, PC (57) ABSTRACT

Systems and methods are provided for remotely managing proxy devices through a gateway device. An example method can include establishing electronic communication between the gateway device and a remotely located management server. The management server can transmit a management agent to the gateway device. The management agent can be software that is configured to receive and carry out commands provided by the management server. The management server can also transmit a plugin to the gateway device. The plugin can be configured to translate a first command, received from the management server, into a second command that is capable of being carried out by the proxy device. The method can also include transmitting the first command, including an executable instruction, from the management server to the gateway device. The first command can instruct the gateway device to cause the proxy device to perform an action.

20 Claims, 5 Drawing Sheets

(58) Field of Classification Search
CPC ............ H04L 41/0266; H04L 41/0806; H04L 41/0809; H04L 41/0816; H04L 41/0893; H04L 12/24; H04L 12/28; H04L 12/2803; H04L 12/4625; H04L 41/00; H04L 67/12; H04L 67/025; H04L 67/34; H04L 67/125; H04L 29/08; G06F 9/445; G06F 9/4416; G05B 19/4185; A63F 13/30
USPC .......................................................... 709/223
See application file for complete search history.

(56) References Cited

U.S. PATENT DOCUMENTS

| | | | | |
|---|---|---|---|---|
| 2013/0212574 | A1* | 8/2013 | Hutchinson | H04L 41/082 717/172 |
| 2015/0295763 | A1* | 10/2015 | Yu | H04L 41/08 726/4 |
| 2017/0099176 | A1* | 4/2017 | Jain | H04L 67/12 |
| 2017/0187831 | A1* | 6/2017 | Otting | H04L 41/0886 |
| 2017/0242557 | A1* | 8/2017 | Rotschield | H04L 41/22 |
| 2017/0288965 | A1* | 10/2017 | Cebere | H04L 41/0876 |
| 2017/0289176 | A1* | 10/2017 | Chen | H04L 63/1416 |
| 2017/0323087 | A1* | 11/2017 | Kline | H04L 9/0869 |
| 2018/0176229 | A1* | 6/2018 | Bathen | H04W 12/106 |
| 2018/0191814 | A1* | 7/2018 | Kinarti | H04L 67/1034 |
| 2018/0205568 | A1* | 7/2018 | Bae | H04L 12/2834 |
| 2018/0227762 | A1* | 8/2018 | Stan | H04L 63/1408 |

OTHER PUBLICATIONS

H. Hsieh, K. Chang, L. Wang, J. Chen and H. Chao, "ScriptIoT: A Script Framework for and Internet-of-Things Applications," in IEEE Internet of Things Journal, vol. 3, No. 4, pp. 628-636, Aug. 2016, doi: 10.1109/JIOT.2015.2483023. (Year: 2016).*
Skaalsveen, Anders. Development of smart devices in Node. JS. An exploratory approach. MS thesis. 2015. (Year: 2015) (Year: 2015).*
Sheng, Z , et al., "Recent advances in industrial wireless sensor networks towards efficient management in IoT", IEEE access, May 19, 2015, 622-37 (Year 2015).

* cited by examiner

CONTROLLING PROXY DEVICES THROUGH A MANAGED GATEWAY

This application claims priority as a continuation of U.S. patent application Ser. No. 15/463,103, filed Mar. 20, 2017, which is expressly incorporated by reference herein in its entirety.

BACKGROUND

The development of the "internet of things" ("IoT") has led to an increasing number of devices capable of connecting to the internet. A modern home, for example, might include internet-capable devices such as a thermostat, refrigerator, television, security camera, door locks, website portal, and lighting. Some of these devices can collect information and transmit it wirelessly. For example, a smart thermostat can include a sensor that detects the presence of a user, causing the thermostat to adjust based on the presence or absence of the user and transmitting this information to the user's mobile device. As another example, a refrigerator can detect when a food item is running low and either alert the user or order a replacement food item automatically. Regardless of their particular capabilities, these internet-capable devices are referred to herein as "proxy devices." This term is used for convenience and is not intended to limit the types of devices to which this disclosure applies.

Various types of proxy devices exist, with each proxy device potentially using a different operating system, different application program interfaces, and collecting unique information and performing unique actions based on that information. As a result, each device requires a custom software solution in order to provide a user with control over the device. For example, a user may need to download an application on their mobile device in order to control a single proxy device. If the user owns multiple proxy devices, he or she will probably need to download multiple applications to support these devices. This requirement reduces the user's efficiency and complicates their daily life.

The need for custom software solutions for different proxy devices creates other issues as well. The most apparent of these issues is the lack of interoperability or centralized control. A user cannot simply install various proxy devices and expect them to work together without additional customization. Another issue is an increased cost for proxy devices. A company that manufactures and sells a proxy device will need to dedicate resources to software development, adding to the cost of the product that is eventually sold to customers. Yet another issue is the lack of coordinated security between proxy devices. While a custom software solution for a particular proxy device can include security features, these features may not align with other proxy devices and present the user with a disjointed approach to their personal security.

Existing infrastructure is unable to provide direct management of proxy devices. In the mobile device space, for example, a Mobile Device Management ("MDM") or Enterprise Mobility Management ("EMM") system provides the architecture to directly manage mobile devices such as smartphones, tablets, and laptops. However, proxy devices typically lack the sophistication of a mobile device, rendering them unable to install and run the management software necessary to be managed by an MDM or EMM system. They also may not be capable of connecting to the MDM or EMM system.

As a result, a need exists for an improved management architecture that can reliably manage a disparate group of proxy devices. More specifically, a need exists for a management gateway device that can interface with various proxy devices, repackage commands provided by the management system, and provide understandable instructions to the various types of proxy devices.

SUMMARY

Examples described herein include systems and methods for remotely managing a proxy device through a gateway device. An example method can include enrolling a gateway with a management server. The management server can transmit a management agent to the gateway. The management agent can be software that is configured to receive and carry out commands provided by the management server.

The system can include a three-tier architecture where the management server manages proxy devices through the gateway. The management server can enroll the proxy devices at the management server. The proxy devices can be assigned to profiles that have associated rules and attributes. The profiles can indicate which gateway the proxy device communicates with. The profiles can also indicate a plugin for controlling, the proxy device. Based on the profiles, plugins and executables can be sent to the gateway for carrying out actions at the proxy devices. A profile can, also be sent to the gateway for use in configuring a proxy device.

The management server can transmit a plugin to the gateway. The plugin can be configured to translate a first command, received from the management server, into a second command that is capable of being carried out by the proxy device.

The management server can also transmit the first command, including an executable instruction, to the gateway. In one example, the first command instructs the gateway to cause the proxy device to perform an action. The action can be specific to the proxy device, such as turning on lights or adjusting a thermostat. In some examples, the first command can instruct the gateway to cause multiple proxy devices to each perform an action. The multiple proxy devices can be different types of devices, and each can perform an action distinct from the others based on the instructions received from the gateway.

In some examples, the management server can issue a command to the gateway instructing the gateway to collect information from one or more proxy devices. The type of information requested by the gateway can be specific to the particular proxy device from which the information is requested. The management server can also request the collected information from the gateway. The management server can also request, from the gateway, information identifying any proxy devices connected to the gateway.

In some examples, prior to transmitting the management agent to the gateway, the gateway can be enrolled at the management server. This can include, for example, associating the gateway with a user, providing credentials for a user associated with the gateway, and validating and updating the gateway.

In another example, a non-transitory, computer-readable medium is provided. The medium can contain instructions that, when executed by a processor, perform stages for remotely managing a first device through a gateway. The processor can be a processor of a management server, for example. The stages performed by the processor of the management server can include establishing electronic communication between the gateway and the management server. This can be accomplished by, for example, detecting a signal from the gateway attempting to connect to a Uniform Resource Locator ("URL") associated with the management server.

The stages performed by the processor of the management server can also include transmitting a management agent from the management server to the gateway. The management agent can be configured to receive and carry out commands provided by the management server. Upon receiving the management agent, the gateway can install the management agent in a memory store.

The stages performed by the processor of the management server can further include transmitting a plugin from the management server to the gateway. The plugin can be configured to translate a first command received from the management server into a second command capable of being carried out by the first device. The stages can also include transmitting the first command from the management server to the gateway. The first command can include an executable instruction to be executed by the plugin.

In another example, a system is provided for remotely managing a first device through a gateway. The system can include a management server that remotely enrolls the gateway and provides management functionality over the first device. The management server can transmit a management agent to the gateway, either as part of the enrollment process or separately. The management agent is configured to receive and carry out commands provided by the management server. The management server can also transmit a plugin to the gateway. The management server can identify the plugin based on a profile for the first device. The plugin is configured to translate a first command, received from the management server, into a second command that is capable of being carried out by the first device. The first command can include an executable instruction to be executed by the plugin.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are provided for remotely managing a proxy device through a gateway. The terms "proxy device" and "IoT device" are intended to be synonymous with one another. A proxy device can be any physical object that lacks the full functionality or computing power of a PC, laptop, or phone, but which is capable of connecting to the internet and sending or receiving information to another location. A proxy device can include one or more sensors, displays, processors, and other components. It can generate data from a sensor and either store the data or transmit it to another location. A proxy device typically includes a basic operating system, such as a pared-down version of a full operating system. A non-exclusive list of proxy devices available today includes: door locks, smart, bicycle locks, wireless trackers, kitchen appliances, light switches and fixtures, garage-door openers, electrical outlets, irrigation controllers, energy monitors, automobiles, commodity monitoring, thermostats, product-ordering devices, baby monitors, activity trackers, medicine bottles, biometric measuring devices, security cameras, and home-monitoring systems.

An example method can include establishing electronic communication between the gateway and a remotely located management server. The management server can transmit a management agent to the gateway. The management agent can be software that is configured to receive and carry out commands provided by the management server. The management server can maintain profiles for managing the proxy devices. Based on the profile, the management server can also transmit a plugin to the gateway. The plugin can be configured to translate a first command, received from the management server, into a second command that is capable of being carried out by the proxy device. The first command can be an execute command in one example. The management server can also send an executable file for the gateway to execute. In one example, the first command instructs the gateway to cause the proxy device to perform an action. The action can be specific to the proxy device, such as turning on lights or adjusting a thermostat. Additional functionality is also contemplated, as explained in more detail below.

Figure 1:
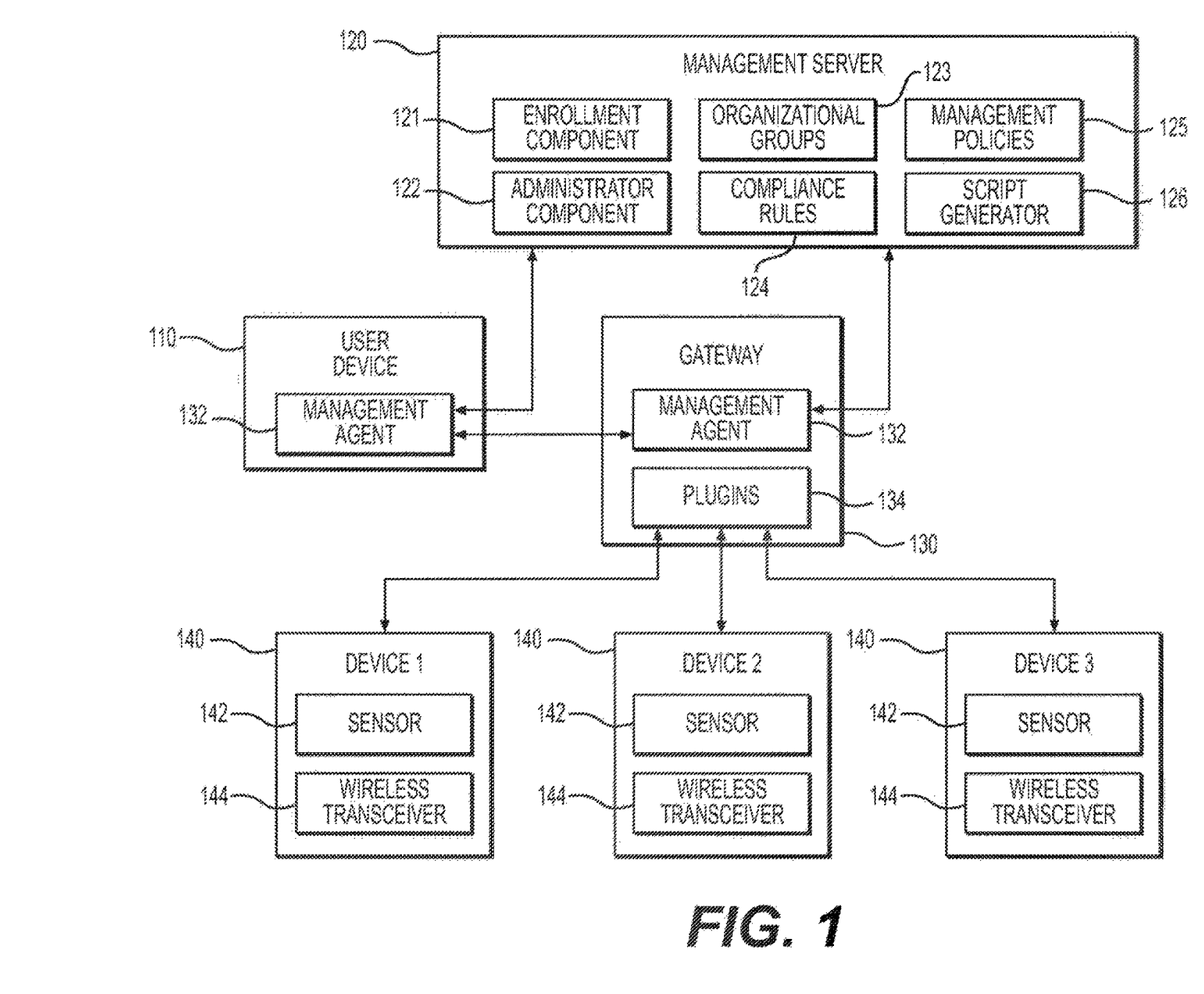
FIG. 1 is an exemplary illustration of system components for remotely managing a proxy device through a gateway.

FIG. 1 provides an illustration of an example system for remotely managing a proxy device 140 through a gateway 130. From a high-level perspective, FIG. 1 includes a user device 110, management server 120, gateway 130, and multiple proxy devices 140. The proxy devices 140 can include any type of device that is capable of transmitting information wirelessly—such as through BLUETOOTH or WIFI—or otherwise capable of connecting to the gateway 130. In some examples, the proxy devices 140 are household devices such as thermostats, refrigerators, televisions, security cameras, door locks, and lighting. The proxy devices 140 can also be office devices, such as wall-mounted displays, coffee machines, printers, copiers, scanners, and shredders. Any other type of wireless-transmission-capable or internet-capable devices can be considered a proxy device 140. In some examples, a user device 110 can also be a proxy device 140.

The user device 110 can include any computing device, such as a cell phone, laptop, tablet, personal computer, or workstation. The user device 110 can include a non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others. Furthermore, the terms "user device" and "mobile device" are used interchangeably.

The user device 110 can enroll with a management server 120—for example, as part of an overall EMM or MDM system. The EMM system can include multiple servers, processors, and computing devices. In some examples, the management server 120 is a network of servers, some of which can be located remotely from one another. In another example, the management server 120 is a single server with multiple purposes. In yet another example, the management server 120 can be one or more servers dedicated to the operations described herein. The management server 120 includes various components for enrollment and compliance monitoring and enforcement, which will be discussed later in this disclosure.

A gateway 130 can also be enrolled with the management server 120. The gateway 130 can be used to control, manage, or simply gather information from multiple proxy devices 140, as explained in more detail below. The gateway 130 can be any type of computing device, such as a cell phone, laptop, tablet, personal computer, or workstation. As explained in more detail below, the gateway 130 can be a standalone device, or it can be reflected as functionality of the user device 110. The gateway 130 can include a processor that executes instructions provided by a non-transitory, computer-readable medium containing instructions that are executed by a processor.

As part of the enrollment process, the management server 120 can cause a management agent 132 to be installed on both the user device 110 and the gateway 130. The management agent 132 can be a portion of an operating system for the devices 110, 130, or it can operate in the application layer of the devices 110, 130. For example, the management agent 132 can be a dedicated application or other software that can monitor and manage data, software components, and hardware components associated with the user device 110 or gateway 130, respectively. The management agent 132 can monitor and control functionality and other managed applications on the devices 110, 130.

The management agents 132 can be customized for the particular device 110, 130 on which they are to be installed. For example, the management agent 132 installed on the gateway 130 can be tailored that device 130. For example, the management agent 132 provided to the gateway 130 can include functionality for executing plugins 134 specific to controlling proxy devices 140. The management agent 132 can specify which plugins 134 to use for particular proxy types. The management agent 132 can also include default proxy command capabilities for when no plugin 134 exists on the gateway 130 for a particular type of proxy device 140.

The management agent 132 can include functionality for collecting data from the proxy devices 140. This functionality can be executed in the same or different software as the management features, depending on the example. The management agent 132, therefore, can include multiple software components, in an example.

The management agent 132 installed on the user device 110 can include functionality for utilizing components specific to the user device 110, such as a GPS sensor, accelerometer, or gyroscope.

The management agent 132 can be an application, or portion of an application, that provides functionality beyond simply monitoring and managing resources in the user device 110 or gateway 130. In one example, a developer can use a SDK to insert, for example, security libraries into an application or plugin 134 that can communicate with the management agent 132. In another example, a developer can incorporate libraries and other components through a process of "wrapping." To wrap an application, a developer can decompile the application, insert the libraries or other components, and then recompile the application. When a library is incorporated into an application, the functionality provided by the library can be called by the management agent 132 executing in the user device 110 or gateway 130. For example, if a security library provides the ability to monitor and enable or disable functionality provided by an application, the management agent 132 can call functions provided by the library to monitor and enable or disable the functionality.

A plugin 134 of the gateway 130 can be an application, or portion of an application, that provides functionality for controlling and communicating with various proxy devices 140. In some examples, the gateway 130 includes multiple plugins 134, where each plugin 134 is configured to interface with a particular type of proxy device 140. In other examples, a single plugin 134 can be configured to interface with multiple types of proxy devices 140.

The plugins 134 can be assigned to gateways 130 at the management server 120 in one example. For example, an administrator can utilize an interface, such as a console, associated with the management server 120 to assign a plugin 134 to a group or proxy device type that is associated with a gateway 130. The management server 120 can associate plugins 134 with proxy devices 140, such as associating them based on device type. The management server 120 can also associate proxy devices 140 to gateways 130 based on profiles or groups. Taking these associations together, the management server 120 can determine which plugins 134 to send to a gateway 130.

The management server 120 can also receive instructions from the administrator and utilize a script generator 126 to automatically create a script that performs the functions requested by the administrator. As an example, an administrator can request that a command be sent to turn on a particular proxy device 140 associated with a particular gateway 130. The script generator 126 can retrieve the relevant scripts, including a scrip that includes executable code written to be understood and carried out by the management agent 132 or a plugin 134 on the gateway 130. The script generator 126 can assemble one or more scripts and package them together to be used as a command, or part of a command, to send to the management agent 132 on the gateway 130.

In some examples, the script generator 126 can generate a script that causes a single plugin 134 to issue a command to a single proxy device 140. In other examples, the generated script can cause a plugin 134 to issue commands to multiple proxy devices 140. In yet other examples, the generated script can cause multiple plugins 134 to issue commands to multiple proxy devices 140. As an example, the plugin 134 can issue simultaneous commands to a light fixture device 140 and a coffee maker device 140 running different operating systems. In one example, the commands can instruct both the light fixture device 140 and coffee maker device 140 to turn on or off. In another example, the commands can be different from one another—such as turning on a light fixture device 140 and requesting information from the coffee maker device 140 regarding whether it is currently in user or not. These example commands and devices 140 are merely exemplary, and any relevant commands can be sent to any number and type of devices 140 via the plugins 134 of the gateway 130.

In one example, the plugins 134 can be provided to the management server 120 by a customer or an original equipment manufacturer ("OEM") that manufactures an associated proxy device 140. The console can allow a customer to upload custom plugins for association with device types, specific proxy devices 140, or gateways 130. The gateway 130, in one example, can include a standardized architecture that the OEM can use to build their own plugin 134.

A proxy device 140 can communicate with a gateway 130 by using a wireless transceiver 144. The wireless transceiver 144 can be any type of component, or set of components, capable of receiving and sending information wirelessly. Examples include a BLUETOOTH transmitter and receiver or WIFI module. Wireless transceivers 144 can be unique across the different devices 140. For example, a first proxy device 140 can include a component that sends and receives BLUETOOTH signals, while a second proxy device 140 includes a component that sends and receives WIFI signals. Of course, a proxy device 140 can include multiple wireless transceivers 144 for transmitting and receiving information to and from the gateway 130. The gateway 130 itself can include multiple types of wireless transceivers for communicating with a wide variety of proxy devices 140.

Each proxy device 140 can also include one or more sensors 142. A sensor 142 can encompass any type of component that takes a measurement or makes a determination. In the case of a thermostat device 140, for example, a sensor 142 can be a thermometer that measures the temperature of the surrounding area. In the case of a light fixture device 140, the sensor 142 can be a simple circuit that senses whether the light is currently turned on or off. An additional sensor 142 can be a light-detection sensor that senses the amount of ambient light in a room. In the case of a coffee machine device 140, sensors 142 can determine whether the machine is on or off, or whether the coffee is brewing or is ready for consumption. Any other types of sensors 142 can be incorporated into a proxy device 140.

A sensor 142 can provide information to a processor of the associated proxy device 140. The processor can instruct the wireless transceiver 144 of the proxy device 140 to transmit information to the gateway 130 using a plugin 134 interface at the gateway 130. In some examples, the plugin 134 provides a sensor status request to the proxy device 140, instructing the proxy device 140 to retrieve data from a sensor 142 and send that data, or other information indicative of that data, to the gateway 130.

As shown in FIG. 1, a gateway 130 can communicate with a management server 120, user device 110, or both. Once a plugin 134 is installed on the gateway 130, the user device 110 can provide instructions to the gateway 130 to be carried out with respect to one or more proxy devices 140. For example, the user device 110 can transmit instructions from the management agent 132 of the user device 110 to a management agent 132 on the gateway 130. These instructions can be carried out similar to instructions provided by the management server 120 to the gateway 130. Additionally, the user device 110 can request information from the gateway 130, such as a request for a status update on one or more proxy devices 140. After retrieving the requested information, the gateway 130 can package and send that information to the user device 110 through the management agent 132 of the gateway 130. In some examples, the gateway 130 provides information simultaneously to both the user device and management server 120. In another example, the user device 110 communicates with the management server 120 in order to retrieve information about the proxy devices 140 or gateway 130.

As mentioned above, the management server 120 can include components for enrolling the user device 110 and gateway 130 and confirming compliance for both. With respect to enrollment, the management server 120 can include an enrollment component 121 and an administrator component 122, either or both of which can be used for the process of enrolling a device 110, 130. For example, the device 110, 130 can communicate with the enrollment component 121 during the initial stages of enrollment. In some examples, the enrollment component 121 can provide a token to the device 110, 130 indicating that the device 110, 130 has been authenticated and is permitted to communicate and enroll with the management server 120. The management server 120 or enrollment component 121 can provide the device 110, 130 with information regarding how to access and communicate with the administrator component 122 in order to continue the enrollment process.

In some examples, the administrator component 122 can request a token from the user device 110 or gateway 130, indicating that the device 110, 130 has been authenticated and is permitted to continue the enrollment process with the administrator component 122. Upon receiving the token, the administrator component 122 can continue the enrollment process. The administrator component 122 can also provide a console for an administrator to configure and monitor the status of the user device 110 and the enrollment process. In some examples, the administrator component 122 can be dedicated to a particular enterprise or group of enterprises, while the enrollment component 121 can be shared across multiple different enterprises.

In addition to the enrollment component 121 and administrator component 122 described above, the management server 120 can include one or more organizational groups 123. An organizational group 123 can include data representing a group of devices 110, 130, 140 managed by the management server 120. An organizational group 123 can correspond to a structure or hierarchy of a business or enterprise, such as an engineering team, accounting team, or marketing team. In other examples, the organization group 123 can correspond to devices 110, 130 located in a particular geographic area, such as office space, a public waiting room, a user's home, or even particular floors, rooms, or portions of a user's home.

In one example, an organizational group 123 can include proxy devices 140 and one or more gateways 130. The organizational group 123 can be used to control which gateways 130 the proxy devices 140 connect to, in an example. Additionally, the organizational group 123 can be used to determine the appropriate plugins 134 to send to each gateway 130. The plugins at the management server 120 for the proxy devices 140 in an organizational group 123 can be sent to the gateways 130 in that same organizational group 123.

The management server 120 can also include compliance rules 124. A compliance rule 124 can set forth one or more conditions that must be satisfied in order for a user device 110, gateway 130, or proxy device 140 to be deemed compliant. If compliance is broken, the management server 120 can take steps to control access of the device 110, 130, 140 to enterprise files, applications, and email. Compliance rules 124 can be assigned differently to the different organizational groups 123. In addition, compliance rules 124 can be assigned differently to a user device 110, gateway 130, or proxy device 140. For example, a gateway 130 can be restricted from accessing enterprise files, as they are not necessary for the functionality of the gateway 130. At the same time, compliance rules 124 can provide access to enterprise files to the user device 110 based on the user's organization group 123 or other criteria. Meanwhile, compliance rules 124 can cause the proxy device 140 to be wiped if the proxy device 140 leaves a geographic area surrounding an associated gateway 130.

In some examples, a compliance rule 124 can specify one or more triggering conditions. If a triggering condition occurs, the system can react accordingly. For example, the management server 120 can automatically perform one or more remedial actions. In another example, the management server 120 can prompt an administrator to take one or more remedial actions. The management agent 132 of the gateway 130 can also take remedial actions, such as preventing the gateway 140 from issuing commands to proxy devices 140. The management agent 132 of the gateway 130 can also take remedial actions with respect to non-compliant proxy devices 140, such as issuing commands to restart or wipe the proxy device 140. In some cases, remedial actions can be staged, such that the user of a user device 110, gateway 130, or proxy device 140 is provided with a chance to remedy their noncompliance before being subjected to stricter remedial actions.

A management policy 125 can specify that a user device 110, gateway 130, or proxy device 140 has permission to perform or access certain functionality. For example, the user device 110 can be restricted to certain enterprise repositories and functions within applications. Similarly, the gateway 130 can be restricted to certain types of proxy devices 140 or proxy devices 140 belonging to particular organizational groups 123. The organizational group 123 can change over time and include different proxy devices 140 over time. But because the management policy 125 is associated with the organizational group 123 rather than any particular proxy device 140, the management policy 125 can apply to all proxy devices 140 within the organizational group 123 at any given time. An administrator can also manually assign a proxy device 140 to an organizational group 123 if so desired.

Figure 2:
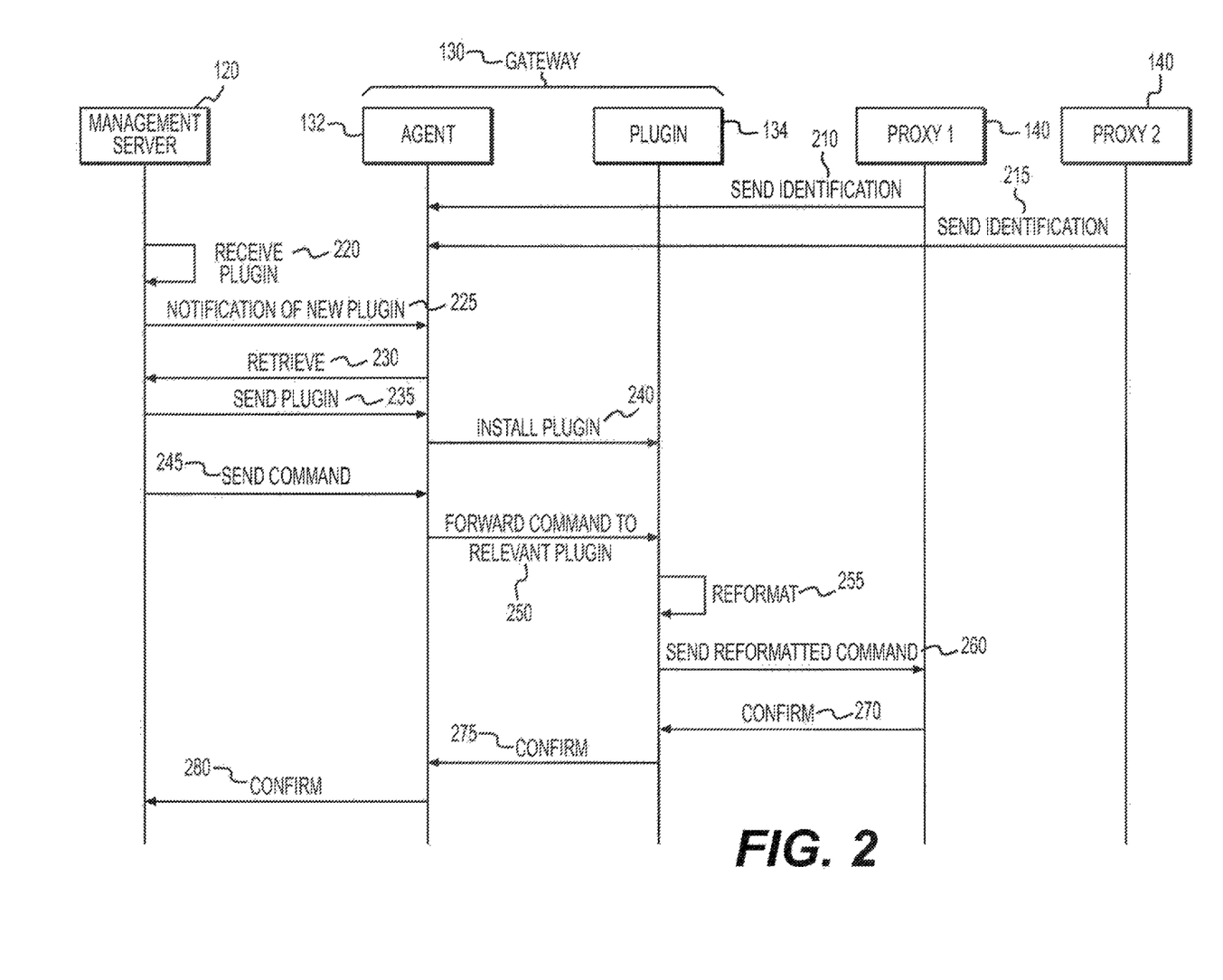
FIG. 2 is a flowchart of an exemplary method for remotely managing a proxy device through a gateway.

FIG. 2 provides a flowchart of an exemplary method for remotely managing a proxy device 140 through a gateway 130. At stage 210, a first proxy device 140, or "first device" in some examples, provides an identification to the management agent 132 executing on the gateway 130. The identification can include information identifying the device 140, such as a Media Access Control ("MAC") address. The identification can also provide information regarding a device type of the proxy device 140, the type of operating system running on the device 140, the number and types of sensors 142 controlled by the device 140, and any other relevant information about the device 140.

The identification can be sent as part of an initial setup process, such as auto-discovery, for the proxy device 140. For example, the proxy device 140 can detect a wireless internet signal in the proximity of the device 140 and attempt to access it. If credentials are required, the proxy device 140 can request credentials from the gateway 130 on the network, or request credentials from the user. After connecting to the gateway 130, or as part of the process of connecting to the gateway 130, the proxy device 140 can transmit the identification information to the management agent 132 of the gateway 130.

At stage 215, a second proxy device 140, or "second device" in some examples, can provide an identification to the management agent 132 on the gateway 130. Similar to stage 210, the identification can include information about the device 140 to be used for controlling the proxy device 140. Any number of proxy devices 140 can provide identification information to the gateway 130. In some examples, a proxy device 140 provides that identification in response to a request from the gateway 130. The gateway 130 can ping all available proxy devices 140 within range, requesting a response from each proxy device 140. In some examples, the gateway pings each proxy device 140 not already connected to the gateway 130. The proxy devices 140 can respond by providing appropriate identification information.

At stage 220, the management server 120 can receive a plugin 134. The plugin 134 can be received from a variety of sources. In one example, an OEM server connects to the management server 120 and uploads a plugin 134 that is compatible with that OEM's proxy devices 140. In another example, a programmer creates a plugin 134 and stores it at a storage location associated with, or accessible by, the management server 120. The management server 120 can determine, or receive an instruction specifying, that the plugin 134 should be delivered to a gateway 130.

At stage 225, the management server 120 can send a notification of an available plugin 134 to the gateway 130. The management agent 132 of the gateway 130 can check in with the management server 120 when resources are available at stage 230. In response, at stage 235, the management server 120 can transmit the plugin 134 to the management agent 132 of the gateway 130 to be stored in a memory store of the gateway 130.

At stage 240, the management agent 132 can install the plugin 134 on the gateway 130. FIGS. 1 and 2 show plugins 134 already installed on the gateway 130, but the installation process can occur for each new plugin 134 delivered by the management server 120. In some examples, stages 235 and 240 can include sending and installing multiple plugins 134. Although FIG. 2 shows the management server 120 providing the plugin 134, in some examples the plugin 134 can be provided in a different manner. For example, the plugin 134 can be downloaded by the gateway 130 from a web server. The web server can be identified, such as with a URL, by the proxy device 140. In that example, the manufacturer of the proxy device 140 can include the URL in a memory store of the proxy device 140 and cause the URL to be transmitted to the management agent 132 of the gateway 130 as part of the identification stage 210 or a separate stage. In other examples, the management server 120 can provide the URL to the gateway 130 with instructions for the gateway 130 to download and install the plugin 134 by itself.

Once a plugin 134 is installed on the gateway 130, a command can be sent to the gateway 130 at stage 245 in order to utilize the plugin 134. Although FIG. 2 shows the command being provided by the management server 120, the command can also be sent from the user device 110. The command can include instructions to be carried out by a proxy device 140, as well as instructions for the gateway 130 regarding delivering instructions to the correct proxy device 140. The command can be received by the management agent 132 on the gateway 130.

At stage 250, the management agent 132 on the gateway 130 can provide the command received at stage 245 to the relevant plugin or plugins 134 on the gateway 130. For example, the management agent 132 can parse the command to determine which proxy device 140, or devices 140, the command applies to. The management agent 132 can then identify the plugin 134 relevant to each identified proxy device 140 and cause the plugin 134 to process the command. In one example, the management agent 132 tracks which plugin 134 to use for which proxy device 140. The management agent 132 can also track which commands are possible at each plugin 134. In one example, multiple plugins 134 can be assigned to the same device type, and the management agent 132 can choose between them based on which commands are available. Alternatively, the management server 120 can specify a particular plugin 134 to use as part of the command. If an appropriate plugin 134 is not present, the management agent 132 can attempt to use a default command set. If the command fails, the management agent 132 can report the failure to the management server 120, and the failure can be noted in the console.

At stage 255, the plugin 134 can reformat the command such that the relevant proxy device 140 will be able to carry out the command. The plugin 134 can execute scripts that identify an action requested by the command, correlate that action to an action available to the relevant proxy device 140, and then rewrite the command, or a portion of the command, to apply to the correlated action of the proxy device 140.

For example, the command sent by the management server 120 can request that every thermostat proxy device 140 in a household be turned off when a particular user device 110 is not geographically located in the household. In one example, the management server 120 determines all of the relevant proxy devices 140 that will be affected by the command at the gateway 130. Then the management server 120 sends a separate command (or job) to the gateway 130 for each of the identified proxy devices 140. Alternatively, the management server 120 can send a single command that implicates multiple proxy devices 140. The gateway 130 can utilize a thermostat plugin 134 to process the command(s). The plugin 134 can reformat the command such that it accords with a protocol, operating system, or other capabilities of the proxy device 140. In one example, the gateway 130 can also identify each thermostat proxy device 140 connected to the household's gateway 130. If a proxy device 140 to which the command applies is not connected, the command can be scheduled as a job for future execution at the gateway 130.

In some examples, stage 255 can be performed at the management server 120 instead of the gateway 130. For example, the plugin 134 generated at the management server 120 can remain at the management server 120. When a job or command is generated, the plugin 134 at the management server can generate or reformat the command such that the relevant proxy device 140 will be able to carry out the command. The management server 120 can send the reformatted command to the gateway 130, and the gateway 130 can pass the command to the appropriate proxy device 140 without needing to reformat or alter the command. In that example, the gateway 130 acts as a pass-through that identifies the correct proxy device 140 and simply forwards the command accordingly.

Returning to the flowchart of FIG. 2, after reformatting the command such that it can be interpreted by the relevant proxy device 140, the plugin 134 can send the reformatted command to the proxy device at stage 260. This can involve, for example, using a wireless transmitter of the gateway 130 to transmit the command to the transceiver 144 of the proxy device 140. The transmission can be done through a wired connection or wirelessly using any type of wireless communication protocol, such as BLUETOOTH or WIFI for example. The proxy device 140 can execute the command using a processor residing in, or otherwise associated with, the device 140.

After executing the command, the proxy device 140 can send a confirmation message back to the plugin 134 at stage 270. The confirmation message can include a confirmation that the proxy device 140 executed the command. In some examples, the confirmation message can include additional information regarding the outcome of executing the command. For example, the proxy device 140 can self-report a status. The proxy device 140 can also provide information received from one or more sensors 142. Using the thermostat again as an example, the thermostat can confirm to the gateway 130 that it executed the command, along with providing a current temperature reading based on a sensor 142 of thermostat. The confirmation message can be provided to the management agent 132 of the gateway 130 at stage 275, and at stage 280 the management agent 132 can transmit a related confirmation message to the management server 120.

Figure 3:
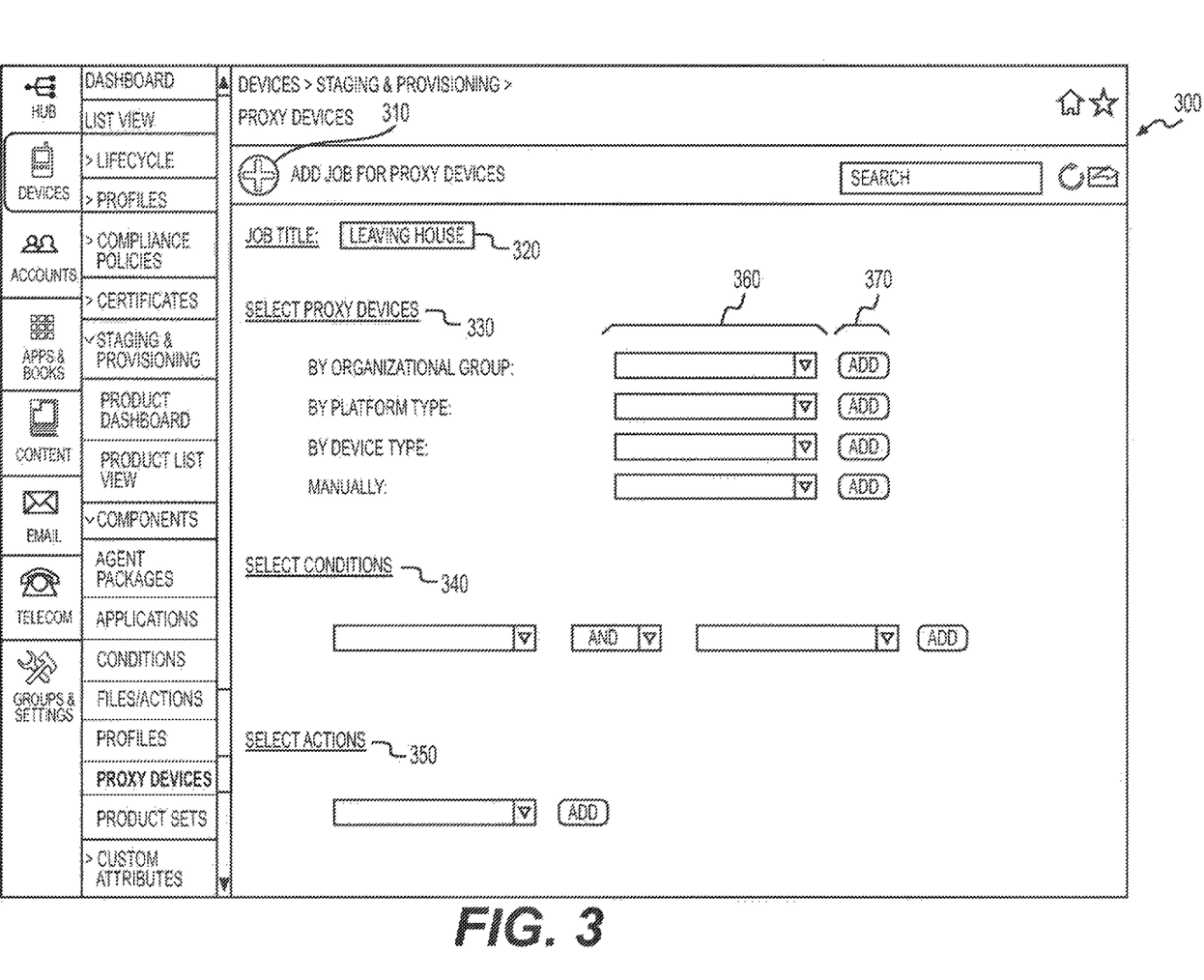
FIG. 3 is an exemplary illustration of a console for remotely managing a proxy device through a gateway.

FIG. 3 is an exemplary illustration of a console for remotely managing a proxy device through a gateway. The console can include a graphical user interface ("GUI") 300 associated with the management server 120. For example, the console can be a web-based GUI 300 that is accessible at a URL. An administrator can access the console GUI 300 through any type of computing device that includes an internet browser. In some examples, the console can be a standalone computing device that includes a display showing the GUI 300. The console GUI 300 can also be available on a display of the user device 110.

The GUI 300 can provide a portal for an administrator to create jobs or commands to be sent to proxy devices 140. The GUI 300 can interface with the management server 120, such that requests made through the GUI 300 are sent directly to the management server 120 for execution. Additionally, the GUI 300 can reflect information made available by the management server 120. For example, a page of the GUI 300 can provide information regarding available gateways 130 that are enrolled with the management server 120. For each enrolled gateway 130, the GUI 300 can show all proxy devices 140 connected to the gateway 130. The GUI 300 can include detailed information regarding the proxy devices 140, such as their location, device type, operating system type, current status, and any other relevant information.

The GUI 300 can also be used to create new jobs or commands for proxy devices 140. At the page shown in FIG. 3, the GUI 300 can include a button 310 for adding a new job for proxy devices 140. After selecting this button 310, a user can be presented with various options for creating a new job. As shown in FIG. 3, for example, the GUI 300 can include a "job title" field 320 for the user to name the job. A "select proxy devices" field 330 can be displayed, providing various options for the user to select relevant proxy devices 140. For example, the user can select proxy devices 140 based on their associated organizational group, platform type, device type, or manually select devices 140 on an individual basis. The GUI 300 can include drop-down menus 360 that are auto-populated based on available options as determined by the management server 120. The user can also utilize an "add" button 370 to select multiple organizational groups, platform types, and so on.

For example, the user can select all proxy devices 140 belonging to an organizational group 123 associated with a particular gateway 130. The user can also select all proxy devices 140 running an iOS operating system. Although not shown, the GUI 300 can include and/or modifiers such that the user can combine various options shown in the "select proxy devices" field 330.

The console GUI 300 can also include a "select conditions" field 340 that allows a user to define conditions upon which an action should be taken. The user can utilize drop-down menus with options that auto-populate based on the proxy devices selected at field 330. For example, if the user selected all lighting in a house by selecting "lighting" in the drop-down menu associated with the "by device type" option, as well as having manually selected a coffee maker proxy device 140 with the "manual" option, at the select conditions field 340 the user can select a time of day, such as 6 A.M. At the "select actions" field 350, the user can select an action of "turn on." After making the desired selections, the user can create the job and send it to the management server 120 for further processing.

The management server 120 can receive the job from the console and process it accordingly. The management server 120 can first check that the selected gateway 130 has an appropriate plugin 134 for processing a command directed to one or more particular proxy devices 140. If the gateway 140 does not have the plugin 134, the management server 120 can deliver a plugin 134 using the method described with respect to FIG. 2. If the gateway 140 has the plugin 134, the management server 120 can create an executable command, or set of commands, to be transmitted to the management agent 132 of the gateway 140. The management agent 132 can receive the instructions, send to the relevant plugin(s) 134 for reformatting, and then have the reformatted commands delivered to the selected proxy devices 140.

The functionality of the console GUI 300 can also be provided through a user device 110 enrolled with the management server 120. In one example, the user device 110 can be used to create jobs as well as manage proxy devices 140 that are already subject to jobs. The user device 110 can connect to the management server 120 for scheduling jobs in one example. Alternatively, the user device 110 can directly communicate with the gateway 130, in an example.

Figure 4:
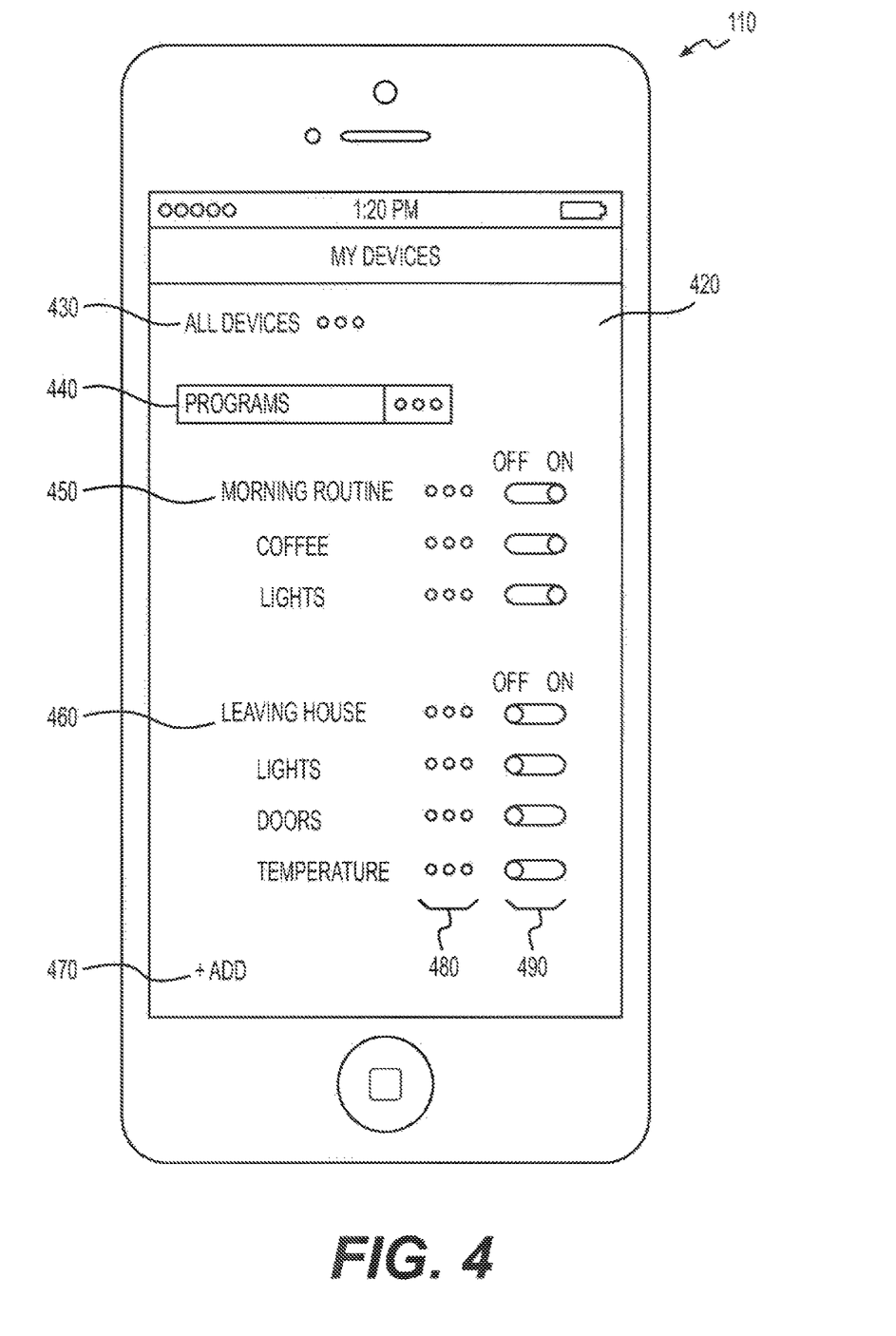
FIG. 4 is an exemplary illustration of an interface on a user device that can be used for remotely managing a proxy device through a gateway.

FIG. 4 shows a user device 110 GUI 420 that provides functionality for both creating jobs and controlling proxy devices 140 on an individual or group basis. The GUI 420 provides an "all devices" field 430 through which a user can access individual proxy devices 140 managed by a gateway 130 that is also enrolled at the management server 120. Selecting the "all devices" field 430 displays a page of the GUI 420 that lists all available proxy devices 140 and provides individual control over each.

The user can also select the "programs" field 440 to view and modify preexisting jobs. In the example of FIG. 4, the programs field 440 is selected and a page showing two existing jobs 450, 460 is provided. The first job 450, titled "morning routine," includes two proxy devices 140 denoted "coffee" and "lights." The job 450 includes a slider 490 that can turn the associated devices 140 on or off as a group. Alternatively, the user can turn the devices 140 on or off using sliders 490 associated with each individual device 140. The "morning routine" job 450 in FIG. 4 is currently turned "on."

The GUI 420 also shows a second job 460 titled "leaving house." This job includes three sets of proxy devices 140: "lights," "doors," and "temperature." Each set of proxy devices 140 can include multiple devices 140. For example, the "lights" set can include multiple light fixtures throughout a house or office. Similarly, the "doors" set can include internet-connected door locks on multiple doors, and the "temperature" devices can include multiple thermostats through the house or office. Turning each of these sets of devices 140 on or off can be done with a single slider 490.

Although FIG. 4 describes an example with personal devices that might be found in a home, the same features and concepts can also apply in the corporate environment. For example, a job can include two sets of proxy devices 140 that include "display televisions," and "printers." The "display television" set can include multiple televisions mounted in a corporate environment to be used for displaying corporate information during working hours. The job can include options for turning these televisions on or off, or displaying particular information on the televisions. The job can also include options for turning printers on or off, or configuring the printers to accept printing jobs routed through particular gateways 130. For example, a gateway 130 could receive a print request from an employee, search for the closest available printer based on the employee's physical location, and send the print request to that printer.

Turning back to FIG. 4, the user can also access further details associated with each job, or each set of devices 140, using the edit buttons 480. The edit buttons 480 can direct the user to a separate page of the GUI 420 that includes options for adding or removing devices 140 to or from a set, adding or removing devices 140 to or from a job, and altering the functionality of the devices 140 when an associated slider 490 is turned off or on. Additional jobs can be created by using the "add" button 470, which can present the user with a GUI 420 page with options similar to the console GUI 300 shown in FIG. 3.

Figure 5:
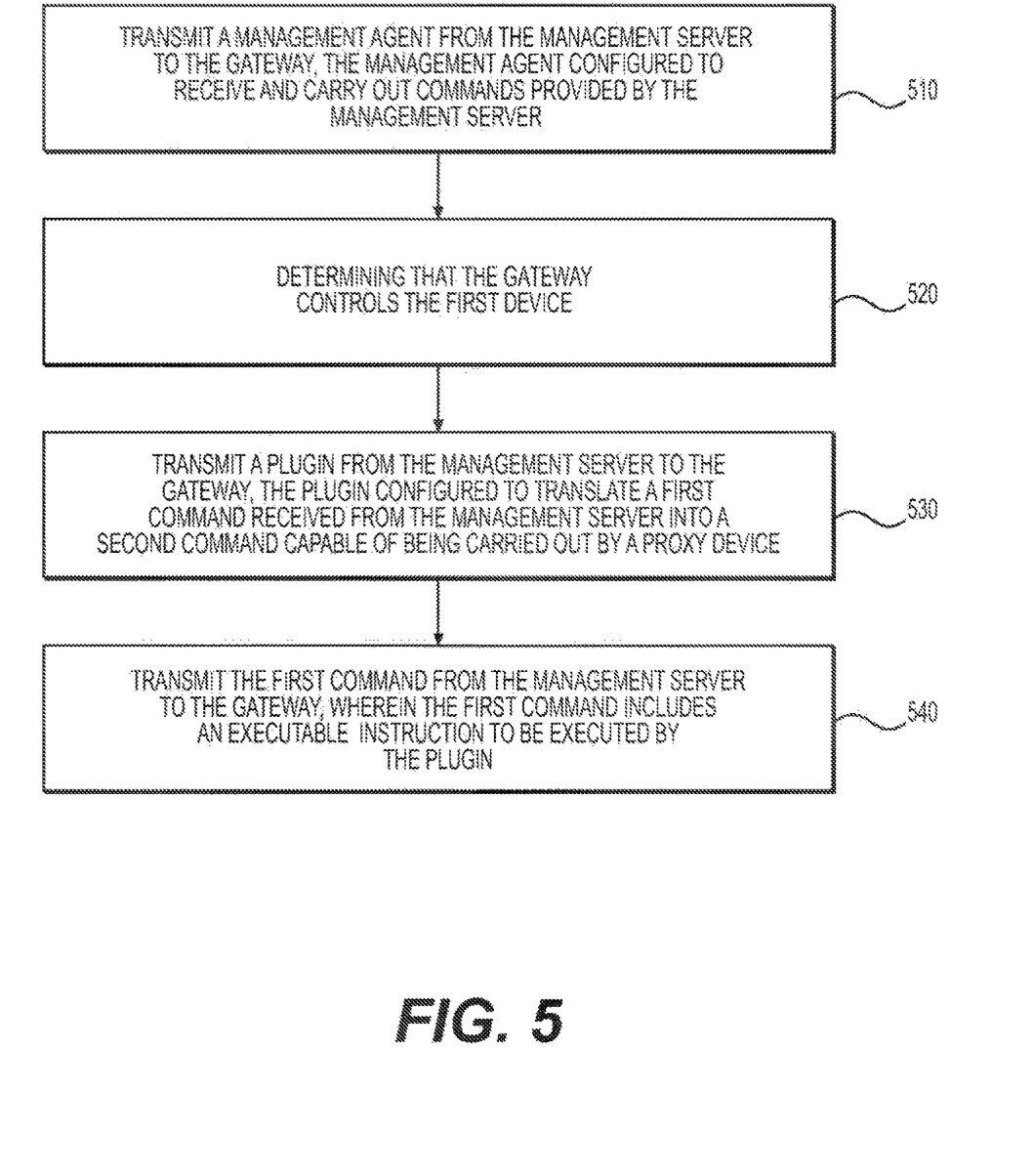
FIG. 5 is a flowchart of an exemplary method for remotely managing a proxy device through a gateway.

FIG. 5 provides a flowchart of an example method for remotely managing a first device through a gateway. Stage 510 of the method can include transmitting a management agent 132 from the management server 120 to the gateway 130. The management agent 132 can be configured to receive and carry out commands provided by the management server 120 and otherwise communicate with the server 120. For example, the management agent 132 can provide information to the management server 120 regarding the status of the gateway 130, including the device type, operating system, and whether the device 130 is on or off. The management agent 132 can also confirm compliance as discussed with respect to FIG. 1. Furthermore, the management agent 132 can orchestrate actions of the gateway 130 that should be taken in response to receiving commands or other information from the management server 120.

Stage 520 can include determining that the gateway 130 controls a particular proxy device 140. For example, the management server 120 can access stored records that associate gateways 130 and the proxy devices 140 controlled by those gateways 130. If a stored record is unavailable or needs to be updated or confirmed, the management server 120 can ping the management agent 132 installed on a gateway 130 and request a list of proxy devices 140 controlled by the gateway 130. The management agent 132 can cause the gateway 130 to confirm an available connection to the proxy devices 140 before confirming those connections to the management server 120.

Stage 530 can include transmitting a plugin 134 from the management server 120 to the gateway 130. This can also include generating the plugin 134 at the management server 120 using a script generator 126. For example, the management server 120 can receive instructions from the administrator and utilize a script generator 126 to automatically create a script that performs the functions requested by the administrator. An administrator can request a plugin that controls a proxy device 140. The script generator 126 can request, from the management agent 132 of the gateway 130, information regarding the proxy device 140. The information can include the type of operating system executing on the device 140, the sensors 142 controlled by the device 140, and any other relevant information. The script generator 126 can then retrieve relevant scripts from a database and generate a plugin 134 capable of interfacing with the particular proxy device 140 at issue. The plugin 134 can be configured to translate or reformat a first command received from the management server 120 into a second command capable of being carried out by a proxy device 140. The translation or reformatting can be specific to the proxy device 140 type. Commands can be sent from the management server 120 in a standardized format that includes a command code and any associated data, such as files or values. The plugin 134 is responsible for handling the command and processing it on behalf of the specified proxy device 140.

In one example, a command is issued to perform a firmware update on a proxy device 140. The command is provided by the management server 120 and includes the required firmware file and a command code indicating that a firmware update is to be performed. After receiving the command, the management agent 132 at the gateway 130 passes the command to the appropriate plugin 134 for the specified proxy device 140. The plugin 134 recognizes the command as a firmware update command and initiates the firmware update using a protocol defined for the proxy device 140. The firmware update can be performed by transmitting the firmware over a network connection between the management agent 132 and the proxy device 140 and then invoking a remote API on the proxy device 140 to perform the update.

Stage 540 can include transmitting a first command from the management server 120 to the gateway 130. The first command can include an executable instruction to be executed by one or more plugins 134 installed on the gateway 130. The management server 120 can determine the proxy devices 140 and gateways 130 to which the command should apply. For example, a group 123 of proxy devices 140 can be selected or otherwise scheduled for the command. The management server 120 can send individual commands, such as jobs, for each proxy device 140 to the responsible gateways 130. The command can include instructions to be carried out by a proxy device 140, as well as instructions for the gateway 130 regarding delivering instructions to the correct proxy device 140. The command can be received by the management agent 132 on the gateway 130. The management agent 132 on the gateway 130 can provide the command to the relevant plugin or plugins 134 on the gateway 130.

For example, the management agent 132 can parse the command to determine which proxy device 140, or devices 140, the command applies to. For example, a command provided to the management agent 132 from the management server 120 can include an identification of the proxy device 140 for which the command is intended. When the management agent 132 receives a command intended for a proxy device 140, it can determine which plugin 134 should handle the command, based on the identification of the proxy device 140 in the command. The management agent 132 determines the appropriate plugin 134 by using a lookup table that is maintained on the gateway 130. The table associates each proxy device 140, or each proxy device 140 type, with a plugin 134. The management agent 132 can select the appropriate plugin 134 based on the information in the lookup table.

The management agent 132 can then identify the plugin 134 relevant to each identified proxy device 140 and cause the plugin 134 to process the command. The plugin 134 can reformat the command such that the relevant proxy device 140 will be able to carry out the command. The plugin 134 can execute scripts that identify an action requested by the command, correlate that action to an action available to the relevant proxy device 140, and then rewrite the command, or a portion of the command, to apply to the correlated action of the proxy device 140.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for remotely managing a first device through a gateway, the method comprising:
   receiving, at the gateway, a management agent from a management server, the management agent configured to receive and carry out commands provided by the management server;
   providing to the management server, from the gateway, an indication that the first device and a second device are connected to the gateway and controlled by the gateway, wherein the management agent causes the gateway to provide the indication and collect information specific to the first and second devices;
   receiving, at the gateway, a plugin generated by the management server based on a first device type of the first device and a second device type of the second device, the first and second device types being different from one another;
   receiving, at the gateway, a first command and a second command from the management server, the first command identifying the first device and the second command identifying the second device;
   modifying, at the gateway, the first and second commands into commands capable of being carried out on the first device and the second device, respectively, wherein the plugin is utilized for executing scripts to perform the modification of the first and second commands.

2. The method of claim 1, wherein the first command includes an executable instruction to be executed by the plugin.

3. The method of claim 1, wherein the first and second commands are received at the gateway based on the first and second devices being included in the same group stored at the management server.

4. The method of claim 1, wherein the first command instructs the gateway to cause a plurality of devices to each perform an action.

5. The method of claim 1, wherein the first command instructs the gateway to retrieve information from the first device and provide the information to the management server.

6. The method of claim 1, further comprising, prior to transmitting the management agent, enrolling the gateway with the management server.

7. The method of claim 1, further comprising providing to the management server an indication that a new device is connected to the gateway and controlled by the gateway.

8. A non-transitory, computer-readable medium comprising instructions that, when executed by a processor associated with a gateway device, cause the processor to perform stages for remotely managing a first device through the gateway device, the stages comprising:
   receiving, at the gateway, a management agent from a management server, the management agent configured to receive and carry out commands provided by the management server;

providing to the management server, from the gateway, an indication that the first device and a second device are connected to the gateway and controlled by the gateway, wherein the management agent causes the gateway to provide the indication and collect information specific to the first and second devices;

receiving, at the gateway, a plugin generated by the management server based on a first device type of the first device and a second device type of the second device, the first and second device types being different from one another;

receiving, at the gateway, a first command and a second command from the management server, the first command identifying the first device and the second command identifying the second device;

modifying, at the gateway, the first and second commands into commands capable of being carried out on the first device and the second device, respectively, wherein the plugin is utilized for executing scripts to perform the modification of the first and second commands.

9. The non-transitory, computer-readable medium of claim 8, wherein the first command includes an executable instruction to be executed by the plugin.

10. The non-transitory, computer-readable medium of claim 8, wherein the first and second commands are received at the gateway based on the first and second devices being included in the same group stored at the management server.

11. The non-transitory, computer-readable medium of claim 8, wherein the first command instructs the gateway to cause a plurality of devices to each perform an action.

12. The non-transitory, computer-readable medium of claim 8, wherein the first command instructs the gateway to retrieve information from the first device and provide the information to the management server.

13. The non-transitory, computer-readable medium of claim 8, the stages further comprising, prior to transmitting the management agent, enrolling the gateway with the management server.

14. The non-transitory, computer-readable medium of claim 8, the stages further comprising providing to the management server an indication that a new device is connected to the gateway and controlled by the gateway.

15. A system for remotely managing a first device through a gateway, comprising:

a gateway that is remotely enrolled at a management server, wherein the gateway:

receives a management agent from the management server, the management agent configured to receive and carry out commands provided by the management server;

provide to the management server an indication that the first device and a second device are connected to the gateway and controlled by the gateway, wherein the management agent causes the gateway to provide the indication and collect information specific to the first and second devices;

receives a plugin generated by the management server based on a first device type of the first device and a second device type of the second device, the first and second device types being different from one another;

receives a first command and a second command from the management server, the first command identifying the first device and the second command identifying the second device;

modifies the first and second commands into commands capable of being carried out on the first device and the second device, respectively, wherein the plugin is utilized for executing scripts to perform the modification of the first and second commands.

16. The system of claim 15, wherein the first command includes an executable instruction to be executed by the plugin.

17. The system of claim 15, wherein the first and second commands are received at the gateway based on the first and second devices being included in the same group stored at the management server.

18. The system of claim 15, wherein the first command instructs the gateway device to cause a plurality of devices to each perform an action.

19. The system of claim 15, wherein the first command instructs the gateway to retrieve information from the first device and provide the information to the management server.

20. The system of claim 15, further comprising, prior to transmitting the management agent, enrolling the gateway with the management serve.

* * * * *